US010864861B1

(12) United States Patent
Dodman et al.

(10) Patent No.: US 10,864,861 B1
(45) Date of Patent: Dec. 15, 2020

(54) CUSTOMIZABLE OVER-MOUNT STRUCTURE FOR VEHICLE START/STOP BUTTON

(71) Applicant: Continental Automotive Systems, Inc., Auburn Hills, MI (US)

(72) Inventors: Jacob Dodman, Rochester, MI (US); Brian Saloka, Harrison Township, MI (US); Zachary Bolton, Birmingham, MI (US); Jason Schwegler, Grand Blanc, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/709,475

(22) Filed: Dec. 10, 2019

(51) Int. Cl.
*B60R 13/02* (2006.01)
*B60R 25/24* (2013.01)
*B60R 25/045* (2013.01)

(52) U.S. Cl.
CPC ............ *B60R 13/02* (2013.01); *B60R 25/045* (2013.01); *B60R 25/24* (2013.01); *B60R 2325/205* (2013.01)

(58) Field of Classification Search
None
See application file for complete search history.

(56) References Cited

U.S. PATENT DOCUMENTS

| 4,009,363 | A | 2/1977 | Binegar |
| 9,483,886 | B2 | 11/2016 | Bergerhoff et al. |
| 9,499,125 | B2 | 11/2016 | Akay et al. |
| 9,754,431 | B2 | 9/2017 | Sigal et al. |
| 9,842,447 | B2 | 12/2017 | Badger, II |
| 10,286,842 | B2 | 5/2019 | Penilla et al. |
| 2019/0291690 | A1* | 9/2019 | Hickman Guevara ...... B60K 28/04 |

FOREIGN PATENT DOCUMENTS

| CN | 201072710 Y | 6/2008 |
| CN | 201283954 Y | 8/2009 |
| CN | 201488203 U | 5/2010 |
| CN | 203022440 U | 6/2013 |

(Continued)

OTHER PUBLICATIONS

"DKMUS Start Stop Button for BMW E Chassis 1 3 5 6 Series X1 X3 X5 X6 Start Stop Button Cap Engine Switch Power Ignition Replacement (Red+Blue+Black)", https://www.amazon.com/dp/B07MFY1G2B/ref=sspa_dk_detail_1?psc.

(Continued)

*Primary Examiner* — Adolf Dsouza

(57) ABSTRACT

An over-mount structure for over-mounting a vehicle start/stop button that is mounted in a housing with a gap defined between an outer periphery of the start/stop button and an inner periphery of the housing. The over-mount structure includes a mounting body having a first, generally cylindrical, mounting portion having a wall thickness sized to be received within the gap and having an inner diameter sized to make a removable press-fit engagement with an outer diameter of the start/stop button. The mounting body also includes a second generally cylindrical mounting portion, integral with the first mounting portion and in opposing relation therewith. A faceplate is removably coupled to the second mounting portion to cover an end thereof.

18 Claims, 5 Drawing Sheets

(56) References Cited

FOREIGN PATENT DOCUMENTS

| CN | 104269287 | A | | 1/2015 |
|---|---|---|---|---|
| CN | 104347296 | B | | 2/2015 |
| CN | 104347296 | B | * | 5/2016 |
| WO | 2019/136352 | A1 | | 7/2019 |

OTHER PUBLICATIONS

Toyota Motor Company, "Remote Connect Overview, The convenience of Remote Connect enables on-the-go vehicle interaction", Toyota.com, 6 pages.
Ford Motor Company, "Remote start system", Owner.ford.com, 4 pages.
https://www.aliexpress.com/item/Car-sticker-Key-Ring-decoration-sticker-Engineer-star-stop-for-Ford-fiesta-ecosport-1pc-per-set/32310006898.html.
https://www.americanmuscle.com/mmd-start-button-cover-1517-manu-install.html.
https://www.dhgate.com/product/car-start-stop-button-cover-trim-for-bmw/407782030.html.
https://img.indianautosblog.com/2017/02/2017-Honda-City-facelift-engine-start-stop-button.jpeg.
http://www.m3post.com/forums/showthread.php?p=18337365.
http://www.mrnorms.com/new/Accessories/INTERIOR.html.
http://magazin.autobox.cz/2016/03/auta-s-bezklicovym-pristupem-jsou-porad-snadnym-cilem-zlodeju/.
https://www.aliexpress.com/item/START-Engine-Button-Replace-Cover-STOP-Key-Accessories-Switch-Decoration-Universal-For-Mazda-3-BM-BN/32850499775.html.
https://www.aliexpress.com/item/Start-Engine-Button-Replace-Cover-STOP-Key-Accessories-Switch-Decoration-Universal-For-Mazda-3-BM-BN/32878797597.html?spm=2114.10010108.1000015.7.2beb6747GeM1ZP&s=p.
https://www.bosch-mobility-solutions.com/en/products-and-services/passenger-cars-and-light-commercial-vehicles/connectivity-solutions/perfectly-keyless/.

* cited by examiner

CUSTOMIZABLE OVER-MOUNT STRUCTURE FOR VEHICLE START/STOP BUTTON

FIELD

This invention relates to a vehicle start/stop button and, more particularly, to an over-mount structure for mounting over the start/stop button to customize the appearance and detail of the start/stop button without degrading operation of the start/stop button.

BACKGROUND

Conventionally, stickers, decals, or magnets are employed to attach graphics or very light-weight bodies to a vehicle's start/stop button for the purpose of allowing the user/owner the ability to customize the appearance and detail of the start/stop button. A majority of these conventional attached structures use adhesives as an attachment to or around the start/stop button. For specific vehicle models, conventional structures may also use an attachment to the outer bezel surrounding the start/stop button.

A problem associated with these conventional structures is that the bodies, graphics, stickers, and/or decals cannot support very much weight. This is why these conventional attached structures are very light-weight. When adhesives are used for the attachment, such as stickers and decals, permanent damage or deformation to the start/stop button can occur when removed. This can result in part failure, warping, and visual or textural defects to the start/stop button. Another problem resulting from these conventional structures is that adhesives are not permanent and the adhesives used may wear away, resulting in attachment failure and loss of the body that was attached to the start/stop button.

Thus, there is a need to provide a robust over-mount structure for attachment over the start/stop button to customize the appearance and detail of the start/stop button without removing components or degrading operation of the start/stop button.

SUMMARY

An objective of the invention is to fulfill the need referred to above. In accordance with the principles of an embodiment, this objective is achieved by an over-mount structure for over-mounting a vehicle start/stop button. The start/stop button is mounted in a housing with a gap defined between an outer periphery of the start/stop button and an inner periphery of the housing. The over-mount structure includes a mounting body having a first, generally cylindrical, mounting portion having a wall thickness sized to be received within the gap and having an inner diameter sized to make a removable press-fit engagement with an outer diameter of the start/stop button. The mounting body also includes a second generally cylindrical mounting portion, integral with the first mounting portion and in opposing relation therewith. A faceplate is constructed and arranged to be removably coupled to the second mounting portion to cover an end thereof.

In accordance with another aspect of an embodiment, a method is provided for enabling customization of a start/stop button of a vehicle. The start/stop button is mounted in a housing with a gap defined between an outer periphery of the start/stop button and an inner periphery of the housing. The method provides an over-mount structure having a mounting body and a faceplate removably coupled to an end of the mounting body. The faceplate has indicia thereon. The method ensures that a portion of the mounting body can be inserted into the gap and be press-fitted to a periphery of the start/stop button to couple the over-mount structure to the start/stop button without modifying the start/stop button.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
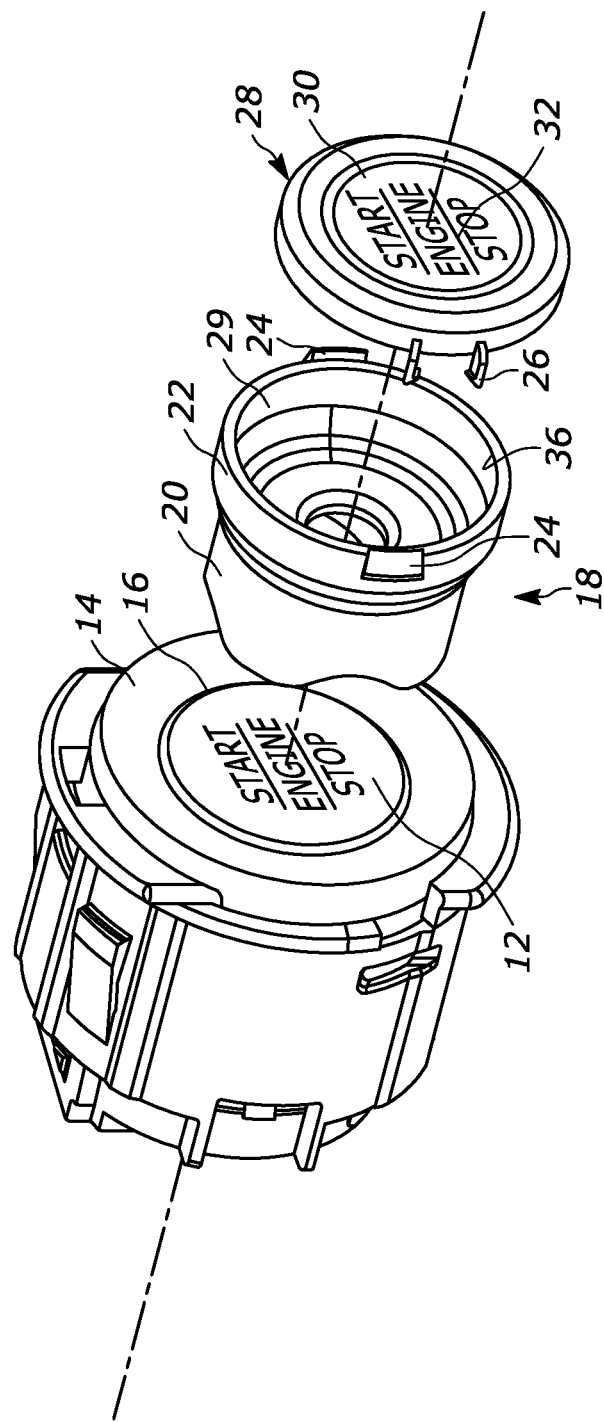
FIG. 1 is an exploded perspective view of over-mount structure in accordance with an embodiment, shown in position to be mounted to a stop/start button of a vehicle.

With reference to FIG. 1, an over-mount structure is shown, generally indicated at 10, for over-mounting a conventional vehicle start/stop button 12 to customize the appearance and detail of the start/stop button 12 without degrading operation thereof. The vehicle start/stop button 12 is mounted in a housing 14 such that there is a small gap 16 between an outer perimeter of the button 12 and an inner periphery of the housing 14. The housing 14 is typically mounted within the dashboard of the vehicle. In the known manner, the start/stop button 12 button 12 is constructed and arranged to be depressed by a user to start or stop the ignition of the vehicle when the vehicle key fob is in sufficient proximity to the button 12.

Figure 2:
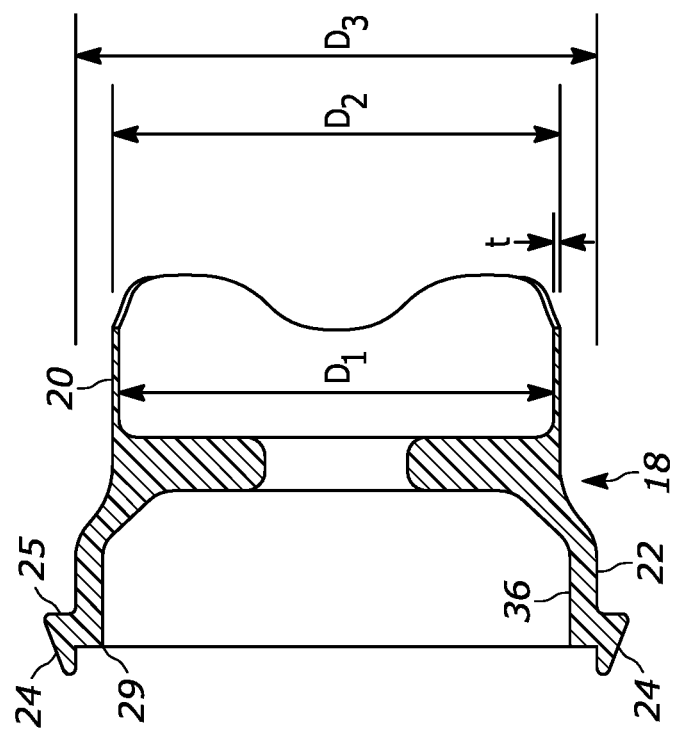
FIG. 2 is a cross-sectional view of a mounting body of the over-mount structure of FIG. 1.

The over-mount structure 10 includes a mounting body, generally indicated at 18, having a first, generally cylindrical mounting portion 20. As shown in FIG. 2, a wall thickness (t) of the first mounting portion 20 is sized to be thin enough so that the first mounting portion 20 can be received with the gap 16 and over the button 12. The inner diameter ($D_1$) of the first mounting portion 20 is sized so as to create a removable press-fit with the outer diameter of the button 12.

Figure 3:
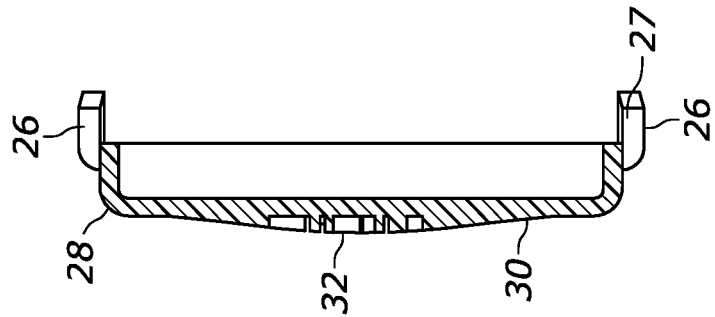
FIG. 3 is a cross-sectional view of a faceplate of the over-mount structure of FIG. 1.
Figure 4:
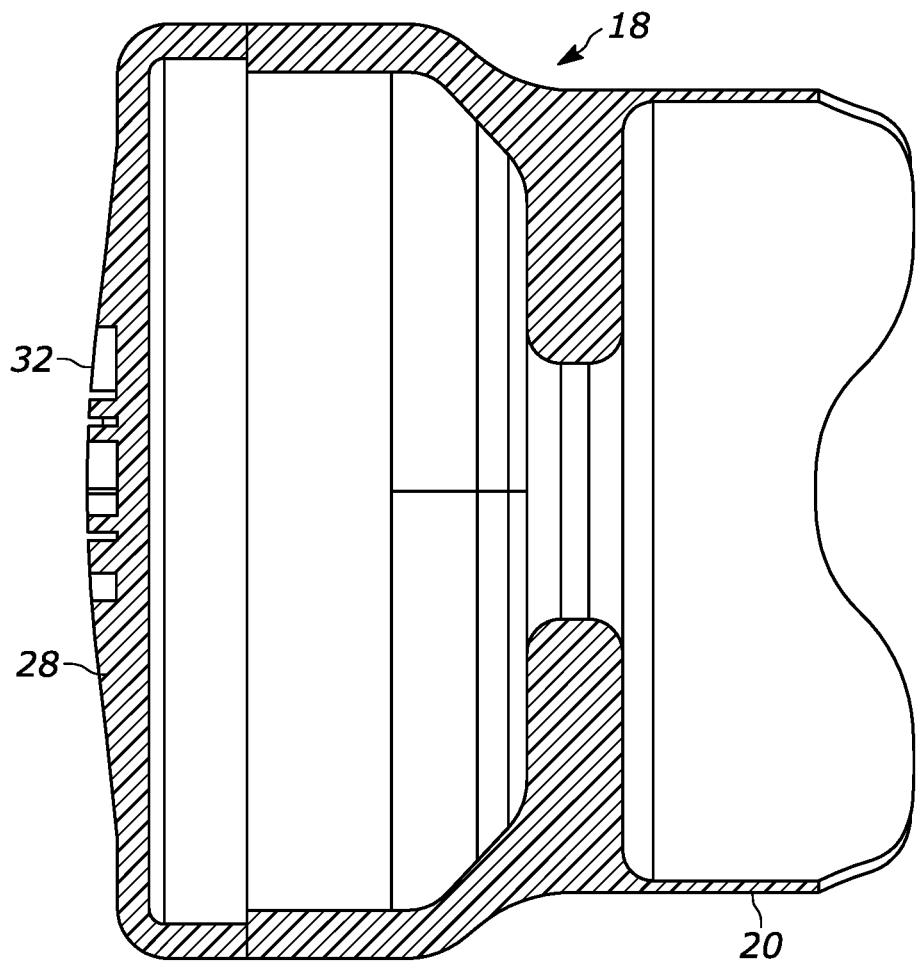
FIG. 4 is cross-sectional view of the over-mount structure of FIG. 1, with the faceplate coupled to the mounting body.
Figure 5:
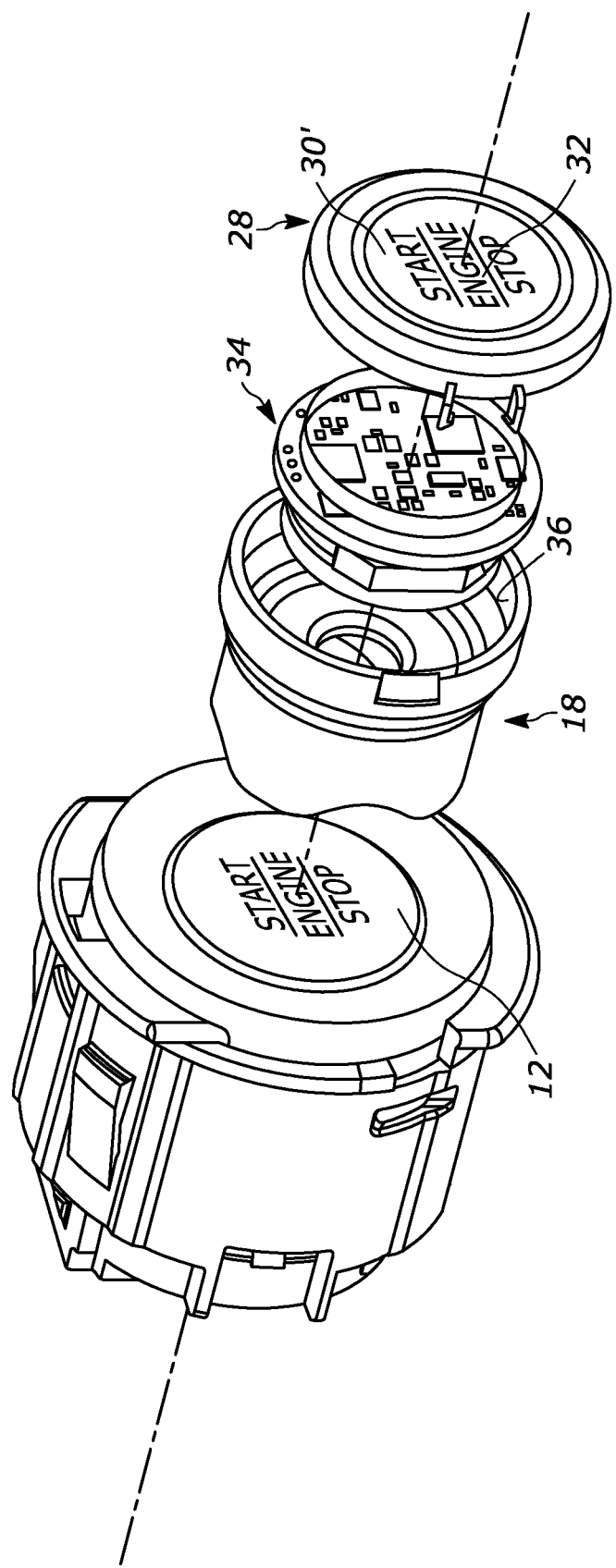
FIG. 5 is an exploded perspective view of a second embodiment of over-mount structure, shown in position to be mounted to a stop/start button of a vehicle.

The mounting body 18 includes a second, generally cylindrical, mounting portion 22, integral with the first mounting portion 20 and in opposing relation therewith. The second mounting portion 22 has an outer diameter ($D_3$) that is larger than the outer diameter ($D_2$) of the first mounting portion 20 and thus a part of the second mounting portion 22 engages a face of the housing 14 when the first mounting portion 20 is in press-fitted engagement with the button 12. The second mounting portion 22 includes a pair of tabs 24 extending from a periphery thereof, each defining an engagement face 25 for receiving a hook 27 on a pair of protruding arms 26 (FIG. 3) of a faceplate, generally indicated at 28, when the faceplate 28 is snap-fitted to the second mounting portion 22. Thus, the tabs 24 and hooks 27 define snap-fitting structure to removably couple the faceplate 28 to the mounting body 18 so as to cover an open end 29 of the second mounting portion 22. The mounting body 18 and faceplate 28 are preferably molded from plastic. The faceplate 28 is shown coupled to the mounting body in FIG. 4. An outer surface 30 of the faceplate 28 includes customized indicia 32. With reference to FIG. 5, the surface 30' can be of a color or contain indicia that is different from that of FIG. 1 and selectable by the user from a variety of faceplates as after-market parts. Thus, a user can swap one faceplate 28 for another, based on a desired customization.

Thus, the first mounting portion 20 of the over-mount structure 10 this placed over and coupled to the start/stop button 12. The first mounting portion 20 is configured to surround the outer periphery of the start/stop button 12 using the thin walled cylinder shape that can be easily inserted into the gap 16 between the start/stop button 12 and the adjacent housing 14. The faceplate 28, when coupled to the mounting body 18, covers the front face of the start stop button 12. The first mounting portion 20 creates a force-fit between the mounting body 18 and the start/stop button 12 to further ensure that the mounting body 18 and the faceplate 28 remain closely attached to the start/stop button 12 such that manually depressing the faceplate 28 activates the start/stop button 12.

The over-mount structure 10 addresses the load/weight requirements of having such a large and heavier structure placed directly over or in front of the start/stop button 12. Also, due to the press-fit connection with the start/stop button 12, the over-mount structure 10 addresses the concern of misplacing or losing the structure and ensures that the structure maintains a secure connection and placement over the start/stop button 12 until removal is desired. The over-mount structure 10 is also configured to minimize or eliminate any potential deformations or damage to the existing start/stop button 12.

Another advantage of the over-mount structure 10 is that it is much easier to install and remove since it does not require the user to precisely position the structure to the button 12. The over-mount structure 10 adjusts itself into place over the start/stop button 12 eliminating any improper placements by the user. The over-mount structure 10 also does not leave any lasting residue, damage, or imperfections on or around the start/stop button 12 during its use or after its removal, or require any modification to the start/stop button 12 or housing 14.

The over-mount structure 10 can be used throughout several fields where attaching an object or part to or around a start/stop button is desired. Other fields include decorating or customizing the design, shape, appearance, and texture of the start/stop button or its surrounding components. It could also prove to be useful in the field of security since the structure itself creates a removable locking structure over the start/stop button 12. The embodiment can be extremely influential in the fields of renting vehicles and fleet vehicles.

In certain instance, the vehicle key fob transponder 33 (FIG. 6) may need to be placed in very close proximity to the installed over-mount structure 10 so as to properly communicate with immobilizer associated with the start/stop button and thus, start or stop the vehicle's ignition.

Figure 6:
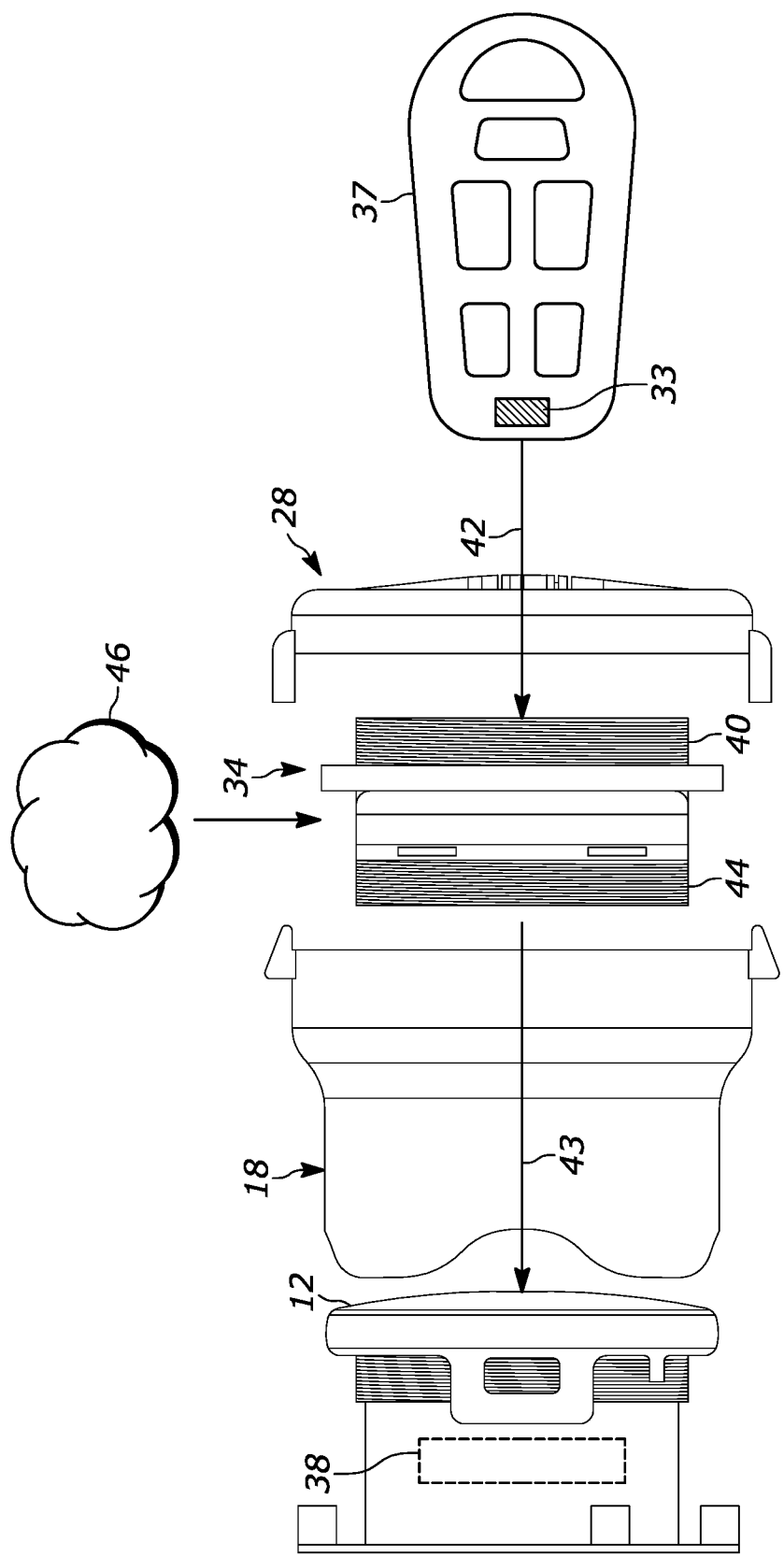
FIG. 6 is a side exploded view of the over-mount structure of FIG. 5.

With reference to FIGS. 5 and 6, a second embodiment of the over-mount structure is shown generally indicated at 10'. This embodiment of the over-mount structure 10' includes a coil structure, shown generally indicated at 34, received in a cavity 36 of the mounting body 18 and covered by the faceplate 28. The provision of the coil structure 34 addresses the issue of needing to position a key fob transponder 33 very close to the start/stop button to allow for proper transponder connectivity with the immobilizer 38 located behind the start/stop button 12.

The coil structure 34 includes a first coil 40 constructed and arranged to receive a wireless radio frequency signal 42 from the transponder 33 of the key fob 37, and based thereon, a second coil 44 is constructed and arranged to transmit a signal 43 to the immobilizer 38. Thus, the double coil arrangement enables the transponder 33 in the key fob 37 to connect with the immobilizer 38 inside the start/stop button housing 14. Thus, by employing the coil structure 34 with the first coil 40 configured to communicate with the transponder 33 in the key fob 37 and the second coil 44 configured to communicate with the immobilizer behind the start/stop button 12, the connection between the immobilizer 38 and the transponder 33 is extended through the over-mount structure 10'. Furthermore, this wireless connection can occur when the key fob 37 is at a distance remote from the over-mount structure 10'.

As shown in FIG. 6, the first coil 40 can also receive a wireless signal from the cloud 46 or a virtual key on a smart mobile phone to start or stop the vehicle instead of using the key fob transponder 33. Coil 44 then transmits a signal 43 to the immobilizer 38. Thus, the key fob 37 need not be used, but can be kept as a backup device. The over-mount structure 10' can be an aftermarket device that can operates with the vehicle's key fob 37 and/or with a user's smart phone. Advantageously, the over-mount structure 10' uses the vehicle's original low frequency transponder-immobilizer communication making it easy to install and does not require removing, modifying or replacing original vehicle factory components.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An over-mount structure for over-mounting a vehicle start/stop button that is mounted in a housing with a gap defined between an outer periphery of the start/stop button and an inner periphery of the housing, the over-mount structure comprising:
   a mounting body comprising:
      a first, generally cylindrical, mounting portion having a wall thickness sized to be received within the gap and having an inner diameter sized to make a removable press-fit engagement with an outer diameter of the start/stop button, and
      a second generally cylindrical mounting portion, integral with the first mounting portion and in opposing relation therewith, and
   a faceplate constructed and arranged to be removably coupled to the second mounting portion to cover an end thereof.

2. The over-mount structure of claim 1, wherein the second mounting portion has an outer diameter that is larger than an outer diameter of the first mounting portion such that when the first mounting portion is in press-fit engagement with the start/stop button, a part of the second mounting portion engages a face of the housing.

3. The over-mount structure of claim 1, wherein the faceplate and second mounting portion include snap-fitting structure constructed and arranged to removably snap-fit the faceplate to the second mounting portion.

4. The over-mount structure of claim 1, wherein the snap-fitting structure comprises:
    tabs, extending from a periphery of the second mounting portion, each defining an engagement face, and
    hooks, extending from a periphery of the faceplate for engaging the engagement faces.

5. The over-mount structure of claim 1, wherein the faceplate includes indicia thereon.

6. The over-mount structure of claim 1, in combination with the start/stop button and housing, with the first mounting portion in press-fit engagement with the start/stop button.

7. The over-mount structure of claim 1, wherein the second mounting portion includes a recess therein and the over-mount structure further comprising coil structure disposed in the recess and covered by the faceplate.

8. The over-mount structure of claim 7, wherein the coil structure comprises:
    a first coil configured to wirelessly communicate with a transponder of a key fob of the vehicle, and
    a second coil configured to wirelessly communicate with an immobilizer associated with the start/stop button,
    wherein the first coil is configured to receive a signal sent from the transponder of the key fob and, based thereon, the second coil is configured to transmit a signal to the immobilizer.

9. The over-mount structure of claim 7, wherein the coil structure comprises:
    a first coil configured to wirelessly communicate with a smart phone, and a second coil configured to wirelessly communicate with an immobilizer associated with the start/stop button,
    wherein the first coil is configured to receive a signal sent from the smart phone and, based thereon, the second coil is configured to transmit a signal to the immobilizer.

10. The over-mount structure of claim 8, in combination with the start/stop button, immobilizer, and key fob, with the first mounting portion being in press-fit engagement with the start/stop button.

11. The over-mount structure of claim 8, in combination with the start/stop button, and immobilizer, with the first mounting portion being in press-fit engagement with the start/stop button.

12. A method of enabling customization of a start/stop button of a vehicle, the start/stop button being mounted in a housing with a gap defined between an outer periphery of the start/stop button and an inner periphery of the housing, the method comprising the steps of:
    providing an over-mount structure having a mounting body and a faceplate removably coupled to an end of the mounting body, the faceplate having indicia thereon, and
    ensuring that a portion of the mounting body can be inserted into the gap and be press-fitted to a periphery of the start/stop button to couple the over-mount structure to the start/stop button without modifying the start/stop button.

13. The method of claim 12, wherein the ensuring step includes:
    providing the portion of the mounting body as generally cylindrical, having a wall thickness sized to be received within the gap and having an inner diameter sized to make a removable press-fit engagement with an outer diameter of the start/stop button.

14. The method of claim 12, wherein the faceplate and the mounting body are removably coupled in snap-fit relation.

15. The method of claim 12, wherein the mounting body includes a recess therein and the over-mount structure further comprising coil structure disposed in the recess and covered by the faceplate.

16. The method of claim 15, wherein the coil structure comprises:
    a first coil configured to wirelessly communicate with a transponder of a key fob of the vehicle, and
    a second coil configured to wirelessly communicate with an immobilizer associated with the start/stop button,
    the method further comprising:
    configuring the first coil to receive a signal sent from the transponder of the key fob and, configuring the second coil to transmit a signal to the immobilizer based on the received signal.

17. The method of claim 15, wherein the coil structure comprises:
    a first coil configured to wirelessly communicate with a smart phone, and
    a second coil configured to wirelessly communicate with an immobilizer associated with the start/stop button,
    the method further comprising:
    configuring the first coil to receive a signal sent from the smart phone and, configuring the second coil to transmit a signal to the immobilizer based on the received signal.

18. The method of claim 12, further comprising:
    providing a plurality of different faceplates each having different indicia and/or color, such that a user can select a customized faceplate for coupling with the mounting body.

* * * * *